United States Patent [19]
Buscher

[11] Patent Number: 6,125,586
[45] Date of Patent: Oct. 3, 2000

[54] ELECTRICALLY OPERATED SLIDABLE DOOR ACTUATOR

[75] Inventor: Hans-Joachim Buscher, Dusseldorf, Germany

[73] Assignee: General Motors Corporation, Detroit, Mich.

[21] Appl. No.: 09/032,806

[22] Filed: Mar. 2, 1998

[30]  Foreign Application Priority Data

Mar. 11, 1997 [GB]  United Kingdom .................... 9705002

[51] Int. Cl.[7] .................................................. E05F 11/00
[52] U.S. Cl. ................................................ 49/360; 49/352
[58] Field of Search ............................ 49/360, 352, 213; 475/311

[56]  References Cited

U.S. PATENT DOCUMENTS

| | | | |
|---|---|---|---|
| 1,695,214 | 12/1928 | Sorensen | 475/311 |
| 2,615,683 | 10/1952 | McCallum | 475/311 |
| 4,921,219 | 5/1990 | Otteman et al. | 284/284 |
| 5,090,634 | 2/1992 | Kaneko | 242/255 |
| 5,139,468 | 8/1992 | Churchill et al. | 475/324 |
| 5,152,725 | 10/1992 | Shank, Jr. | 475/284 |

FOREIGN PATENT DOCUMENTS

| | | |
|---|---|---|
| 0 023 474 | 2/1981 | European Pat. Off. . |
| 1 181 679 | 2/1970 | United Kingdom . |
| 1 571 094 | 7/1980 | United Kingdom . |

Primary Examiner—Daniel P. Stodola
Assistant Examiner—Curtis A. Cohen
Attorney, Agent, or Firm—Kathryn A. Marra

[57]  ABSTRACT

An electrically operated actuator (10) for a slidable door of a motor vehicle comprising a planetary gear set (12) including a sun gear (22), a number of pinion gears (24) rotatably mounted on a planet carrier (26) and interengaging with the sun gear, and a ring gear (28) interengaging with the pinion gears, the sun gear, planet carrier and ring gear being rotatable about an axis (A); an electric motor (14) connected to the planet carrier to rotate the planet carrier about the axis; an electrically actuated brake (16) connected to the sun gear to brake rotation of the sun gear about the axis; a cable drum (18) rotatably driven by the ring gear; and a cable (20) wound around the cable drum and connectable to the slidable door. Allows a reduction in overall dimensions of the actuator.

4 Claims, 2 Drawing Sheets

ELECTRICALLY OPERATED SLIDABLE DOOR ACTUATOR

TECHNICAL FIELD

The present invention relates to an electrically operated actuator for a slidable door of a motor vehicle.

BACKGROUND OF THE INVENTION

Electrically operated actuators for sliding doors of a motor vehicle are known which include an electric motor, a clutch, and a cable drum. A cable passes around the cable drum and is connected to the slidable door. In order to control the force required to move the door, the clutch has to be capable of withstanding forces of the order of 40 Nm, and hence has to have a predetermined minimum size.

SUMMARY OF THE INVENTION

It is object of the present invention to provide an electrically operated actuator for a slidable door of a motor vehicle which has reduced outer dimensions compared to known arrangements.

An electrically operated actuator in accordance with the present invention for a slidable door of a motor vehicle comprises a planetary gear set including a sun gear, a number of pinion gears rotatably mounted on a planet carrier and interengaging with the sun gear, and a ring gear interengaging with the pinion gears, the sun gear, planet carrier and ring gear being rotatable about an axis; an electric motor connected to the planet carrier to rotate the planet carrier about the axis; an electrically actuated brake connected to the sun gear to brake rotation of the sun gear about the axis; a cable drum rotatably driven by the ring gear; and a cable wound around the cable drum and connectable to the slidable door.

With the electrically operated actuator of the present invention, the use of a planetary gear set with an electric brake controlling rotation of the sun gear means the brake need only withstand forces of the order of 10 Nm, thereby allowing the outer dimensions of the actuator to be reduced when compared to previously known actuators.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
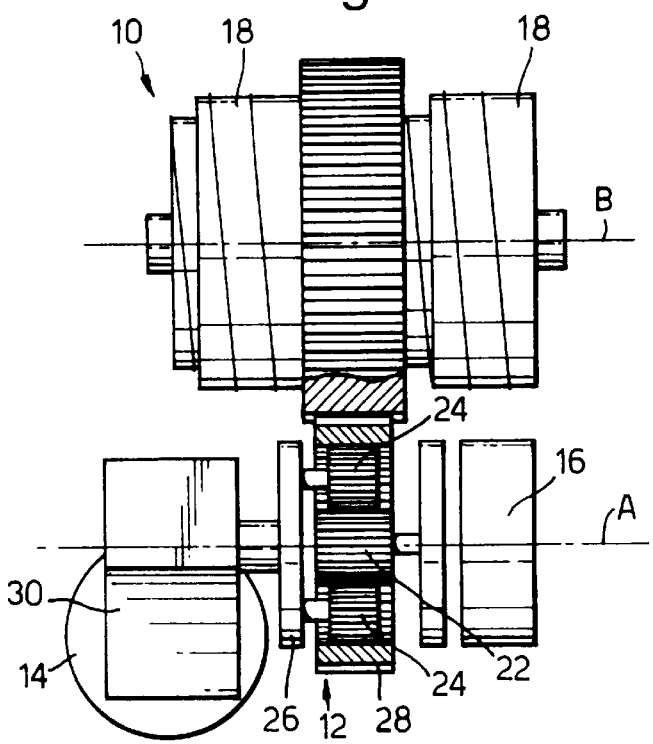
FIG. 1 is an end view of an electrically operated actuator in accordance with the present invention.
Figure 2:
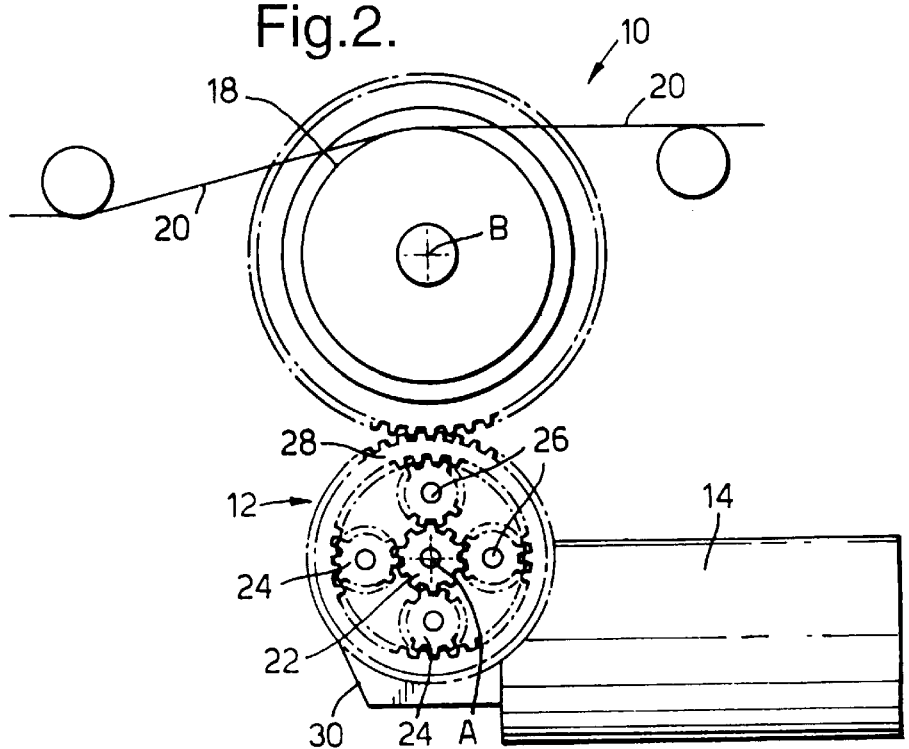
FIG. 2 is a side view of the electrically operated actuator shown in FIG. 1 with the electric brake omitted for clarity.
Figure 3:
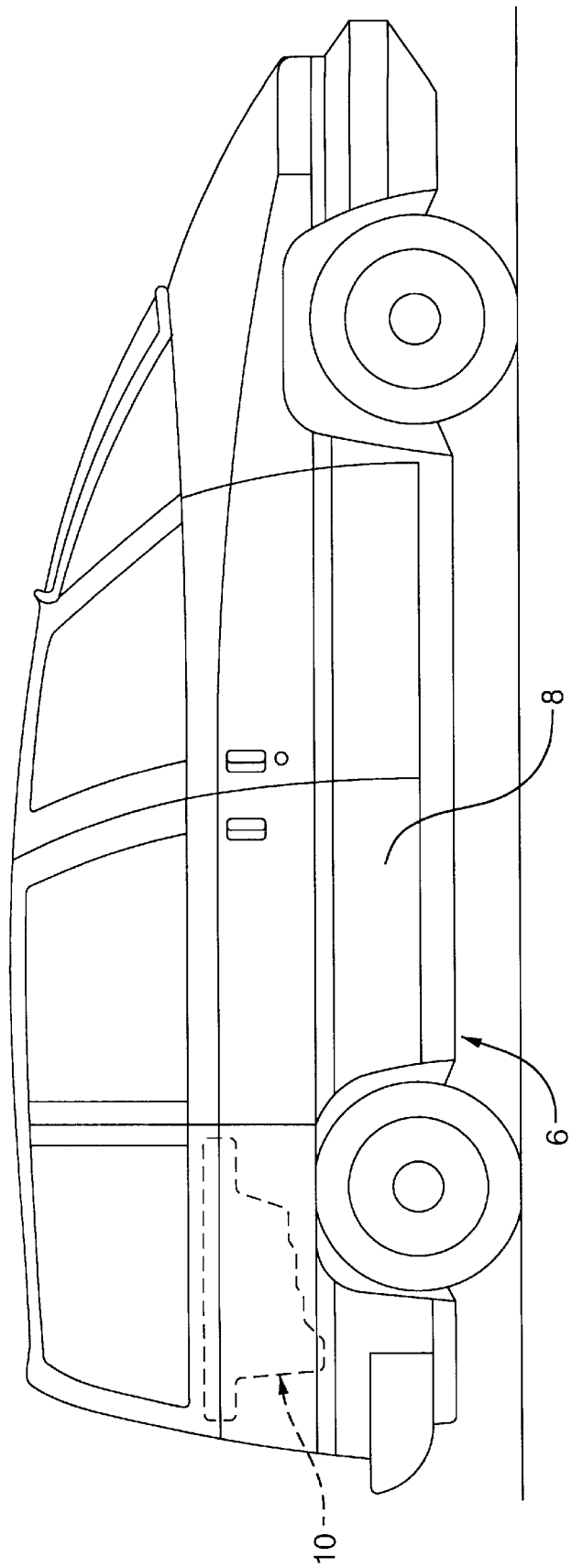
FIG. 3 is a perspective view of a vehicle having an electrically operated actuator in accordance with the present invention.

Referring to the drawings, an electrically operated actuator 10 in accordance with the present invention for a slidable door (not shown) of a motor vehicle comprises a planetary gear set 12, an electric motor 14, an electrically actuated brake 16, a cable drum 18, and a cable 20. The planetary gear set 12 comprises a sun gear 22, a number of pinion gears 24 rotatably mounted on a planet carrier 26, and a ring gear 28. The pinion gears 24 interengage the sun gear 22 and the ring gear 28. The sun gear 22, the planet carrier 26, and the ring gear 28 are all rotatable about a common axis A.

The electric motor 14, which is typically a DC motor, is connected to the planet carrier 26 by gears 30, and on actuation rotates the planet carrier about axis A. The gears 30 preferably prevent back driving of the motor 14. In an alternative arrangement, the electric motor may be a pancake motor which directly drives the planet carrier 26 without the need for additional gears 30. The electrically actuated brake 16, which is preferably an electromagnetic brake, is connected to the sun gear 22, and on actuation prevents rotation of the sun gear about axis A. The ring gear 28 is connected to the cable drum 18, and on rotation of the ring gear about axis A, the cable drum is rotated about axis B.

The cable 20 is wound on the cable drum 18. Each end of the cable 20 is secured to the slidable door (not shown). Rotation of the cable drum 18 about axis B winds the cable 20 in one direction or the other, dependent on the direction of rotation of the cable drum, to either pull the door towards a closed position or move the door towards a fully open position. Any suitable arrangement for moving the door by way of a wound cable, which is known to those skilled in the art, may be used, and will not be described in greater detail.

The electric motor 14 and the electrically actuated brake 16 may be actuated manually by way of a switch (not shown) and/or by way of a switching system associated with the slidable door which is operated after predetermined manual movement of the door. Any suitable switching system, which is known to those skilled in the art, may be used, and will not be described in greater detail.

On receipt of an actuation signal, the electrically actuated brake 16 is actuated to brake the sun gear 22 to prevent the sun gear rotating about axis A, and the electric motor 14 is actuated to rotate the planet carrier 26 about axis A in a direction dependent on the received actuation signal. The brake 16 is preferably actuated slightly before the electric motor 14. Rotation of the planet carrier 26 by the electric motor 14, and non-rotation of the sun gear 22 due to the actuated brake 16, causes the pinion gears 24 to rotate about their axes, thereby rotatably driving the ring gear 28 about axis A. Rotation of the ring gear 28 rotatably drives the cable drum 18 about axis B to move the cable 20, and hence move the slidable door.

Manual sliding of the door is possible when the electric motor 14 and brake 16 are not actuated because the sun gear 22 is free to rotate about axis A, even if the gears 30 prevent rotation of the planet carrier 26 about axis A.

The use of a planetary gear set 12 with a braked sun gear 22 and a motor driven planet carrier 26 to rotatably drive the cable drum 18 considerably reduces the actuating forces required to operate the actuator 10 when compared to previously known actuators which include a clutch. This is because the brake 16 only has to hold a fraction of the motor's output compared to the clutch arrangement in which the clutch has to hold the full output of the motor. As a consequence, the overall dimensions of the actuator 10 can be reduced. Further, the durability of the actuator 10 is increased compared to an actuator which has a clutch.

What is claimed is:

1. The combination of a slideable door of a motor vehicle and an electrically operated actuator for operating the slidable door of the motor vehicle comprising a planetary gear set including a sun gear, a plurality of pinion gears rotatably mounted on a planet carrier and interengaging with the sun gear, and a ring gear interengaging with the pinion gears, the sun gear, planet carrier and ring gear being rotatable about an axis; an electric motor non-declutchably connected to the planet carrier to rotate the planet carrier about the axis whenever the electrical motor is energized; an electrically actuated brake connected to the sun gear to brake rotation of the sun gear about the axis whenever the electrical motor is energized; a cable drum rotatably driven by the ring gear; and a cable wound around the cable drum and connected to the slidable door whereby the door may be operated electrically when the electric motor and the electrically actuated brake are energized or operated manually when the electric motor and the electrically actuated brake are deenergized.

2. An electrically operated actuator as claimed in claim 1, wherein the electrically actuated brake is an electromagnetic brake.

3. An electrically operated actuator as claimed in claim 1 or claim 2, wherein the electric motor is a DC motor.

4. An electrically operated actuator as claimed in claim 1, wherein the electrically actuated brake is actuable before the electric motor.

\* \* \* \* \*